May 12, 1970     L. K. PLOUGHMAN     3,511,526
VEHICLE DOOR LATCH
Filed July 1, 1968     6 Sheets-Sheet 1
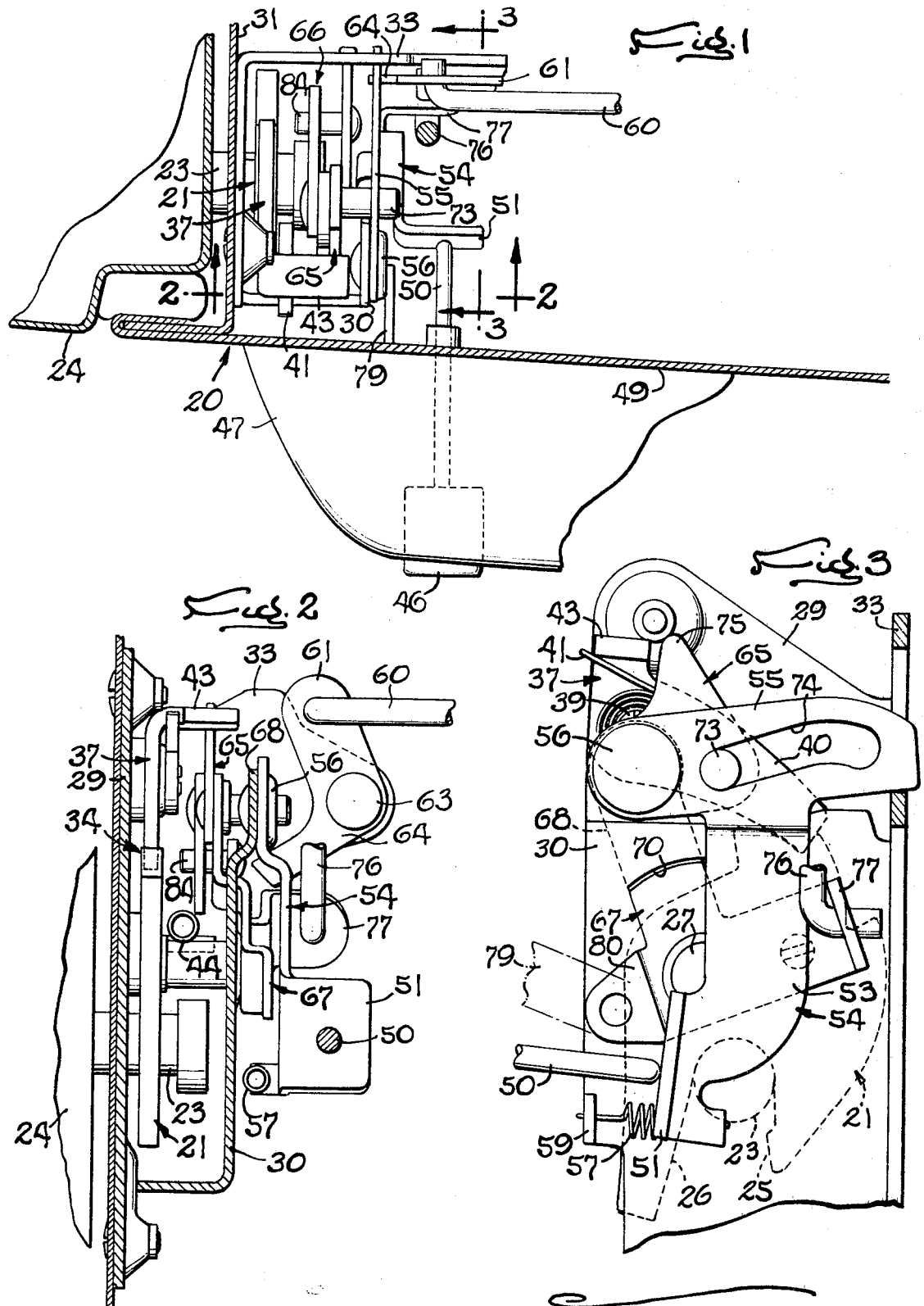
INVENTOR
Leonard K. Ploughman
by Wolfe, Hubbard, Voit & Osann
ATTORNEY May 12, 1970          L. K. PLOUGHMAN          3,511,526
VEHICLE DOOR LATCH
Filed July 1, 1968          6 Sheets-Sheet 2
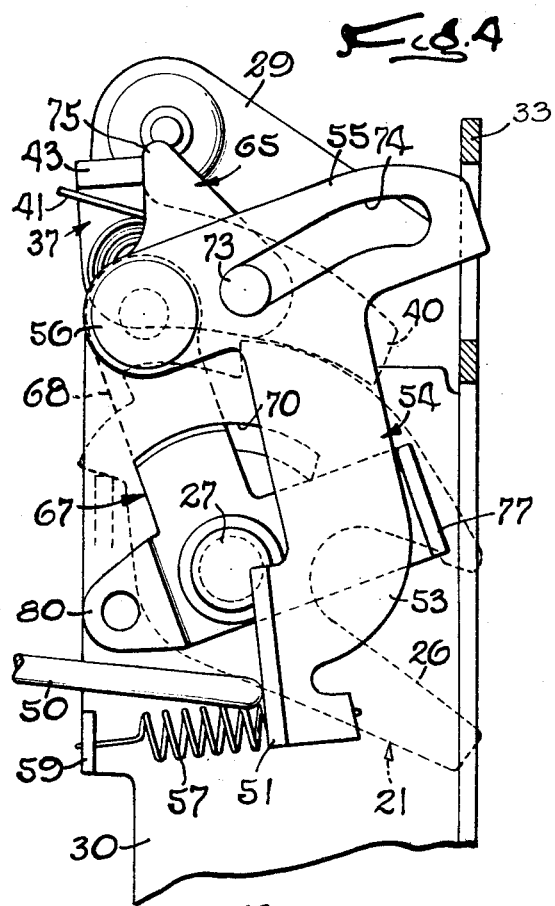
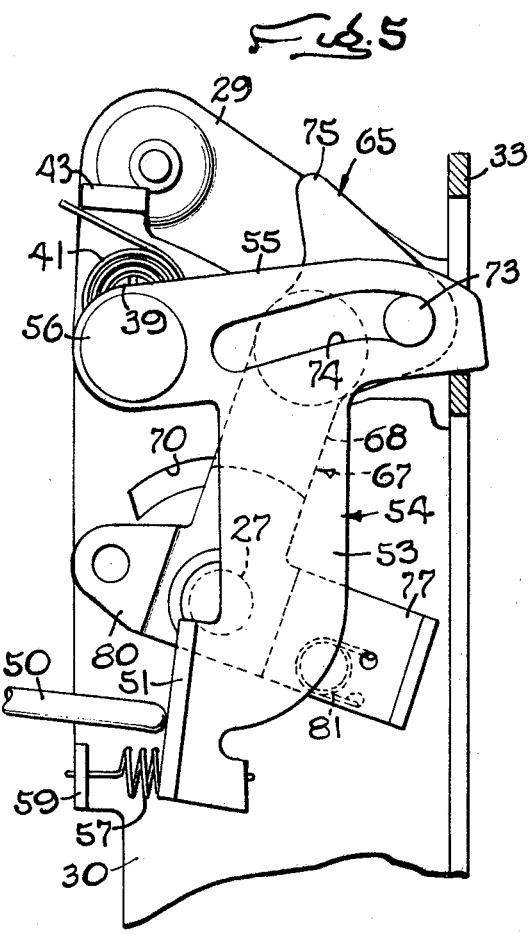
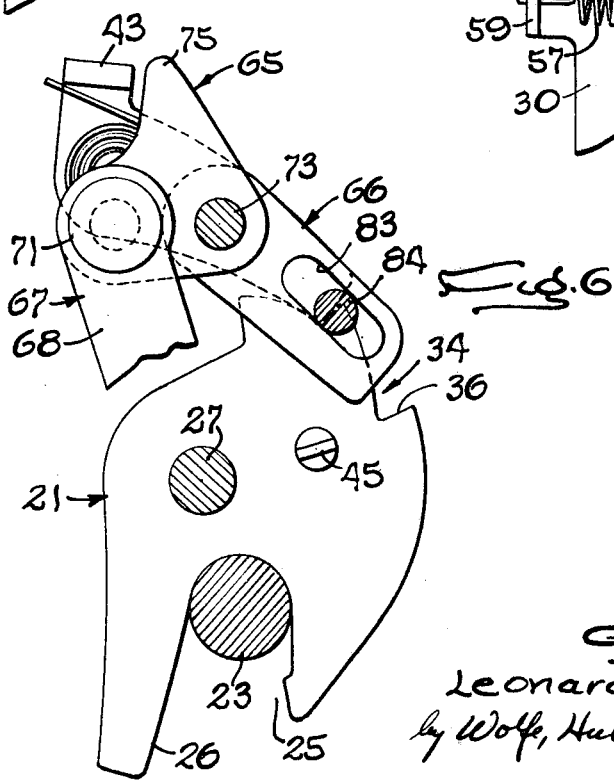
INVENTOR
Leonard K. Ploughman
by Wolfe, Hubbard, Voit & Osann
ATTORNEYS May 12, 1970   L. K. PLOUGHMAN   3,511,526
VEHICLE DOOR LATCH
Filed July 1, 1968   6 Sheets-Sheet 3
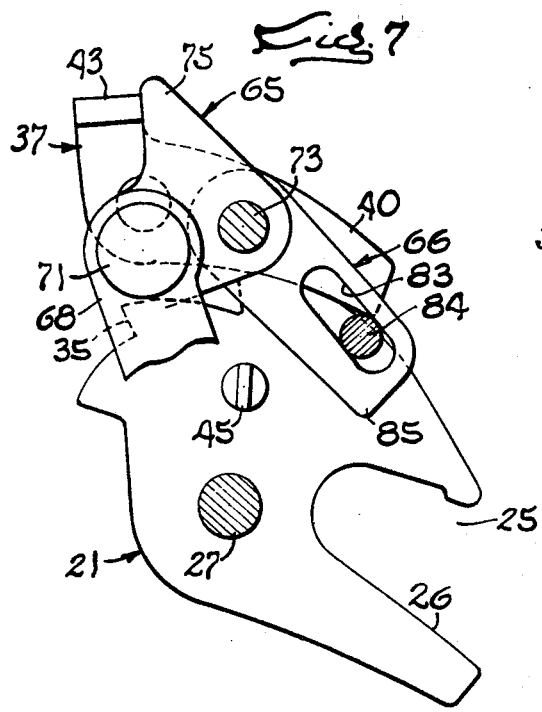
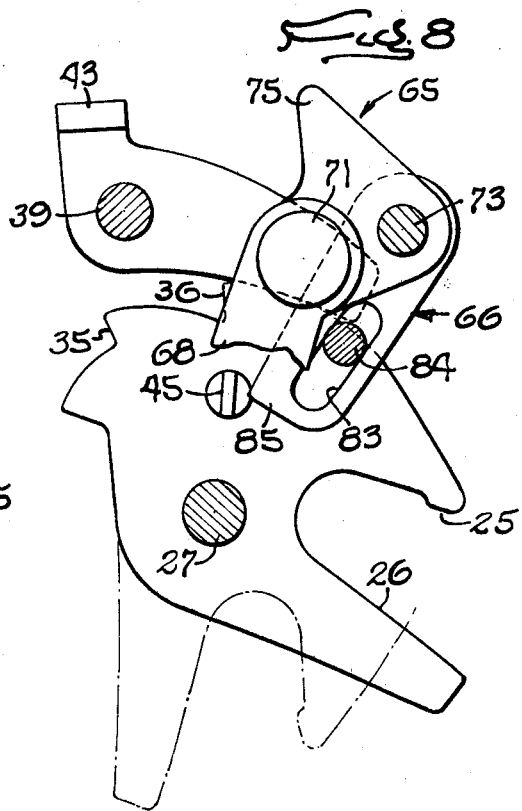
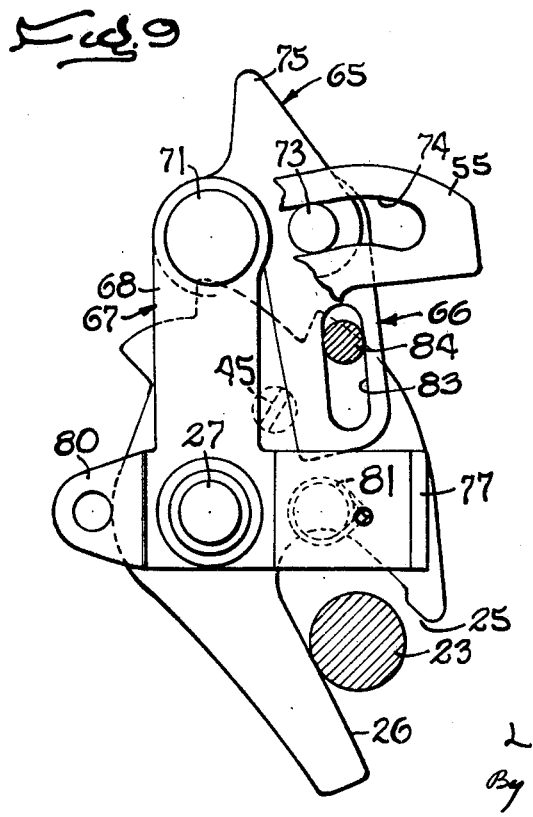
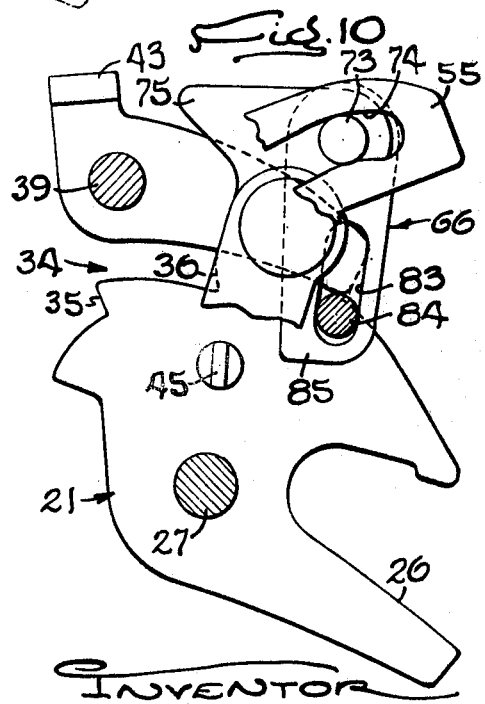
INVENTOR
Leonard K. Ploughman
By Wolfe, Hubbard, Voit & Osann
ATTORNEYS

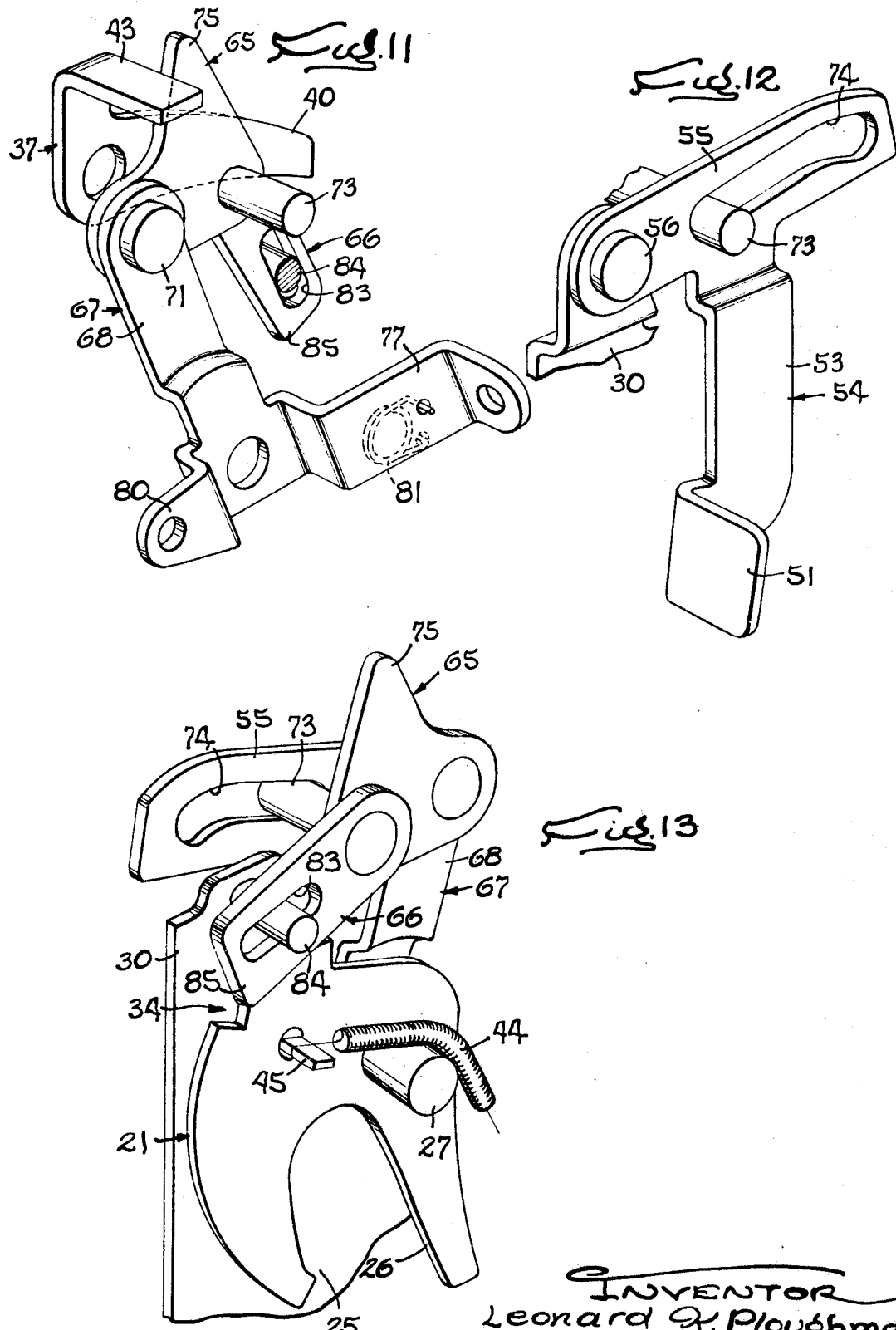

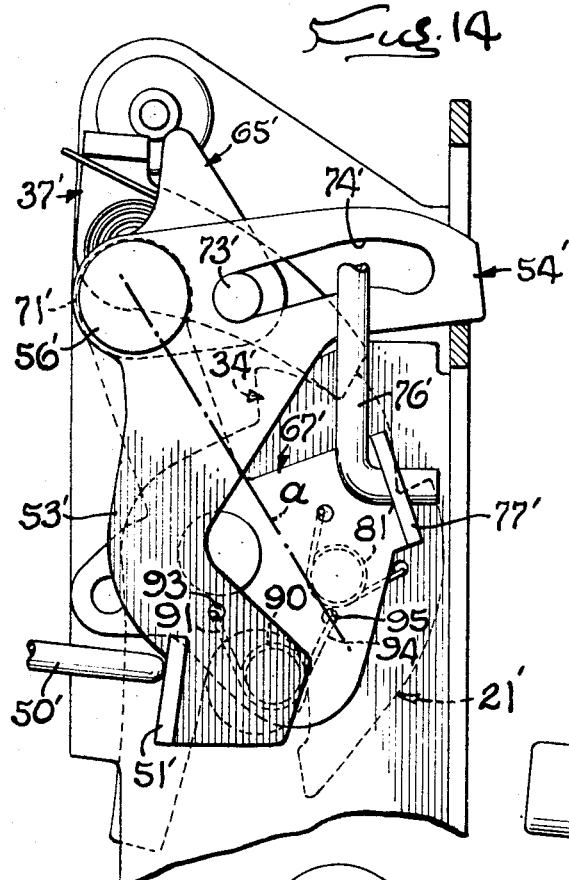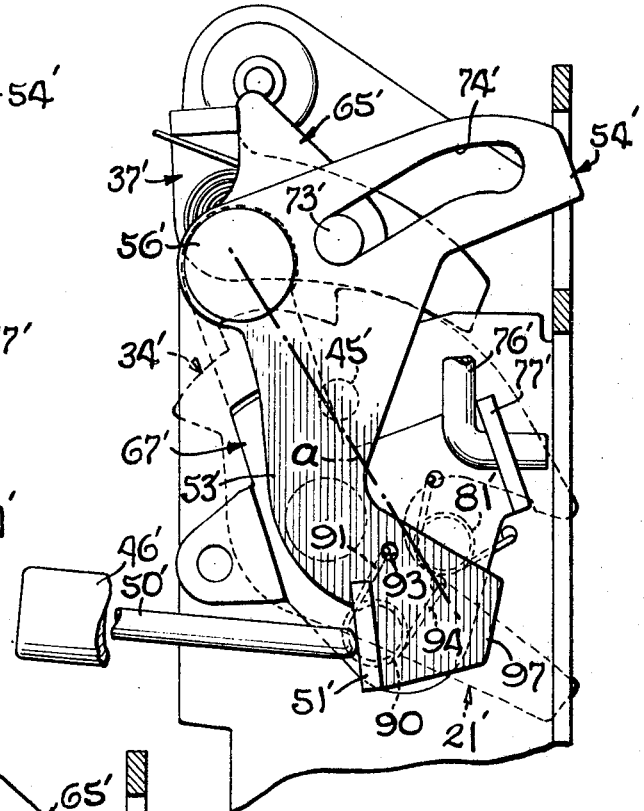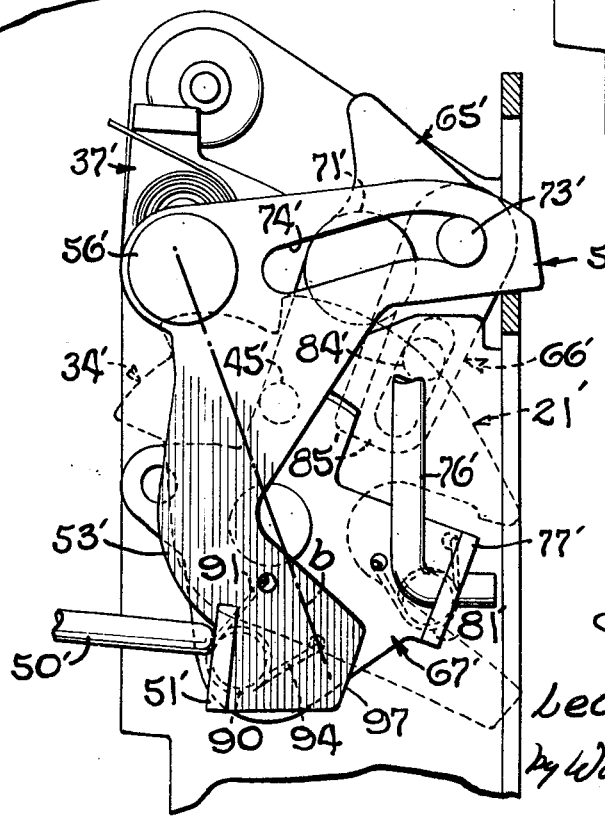

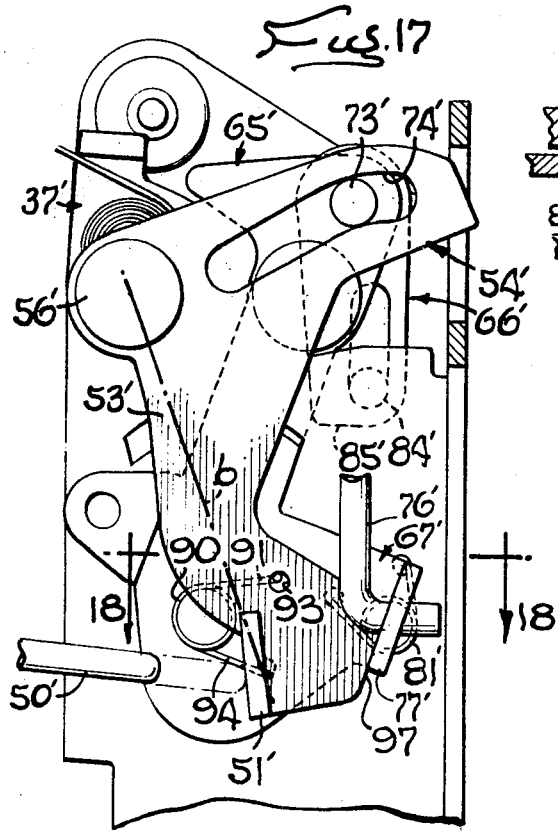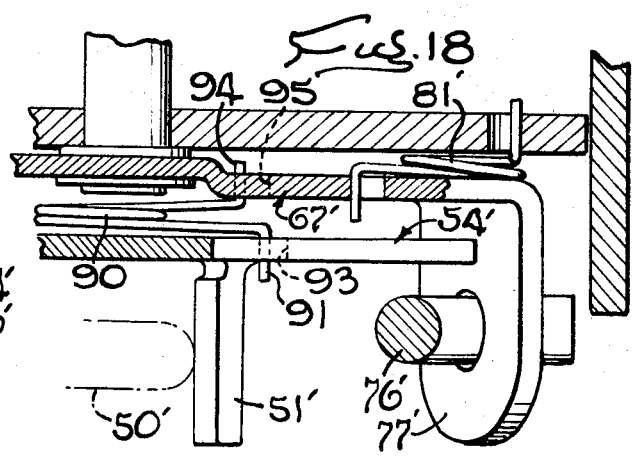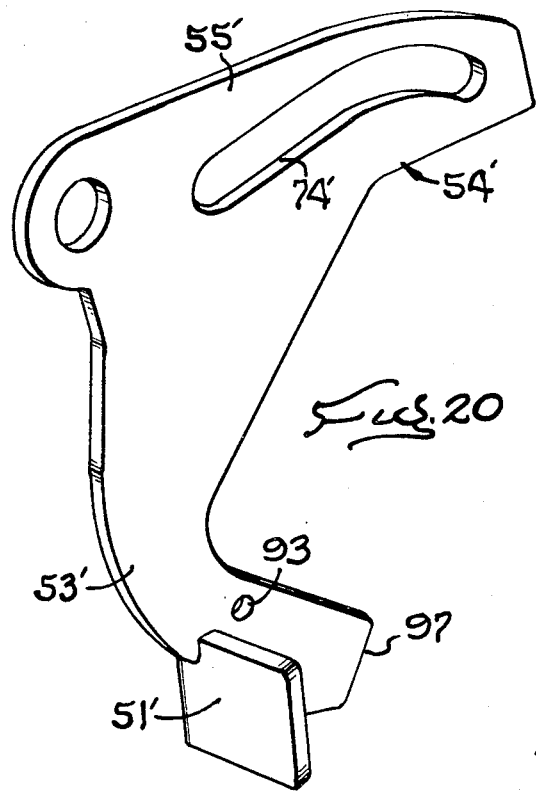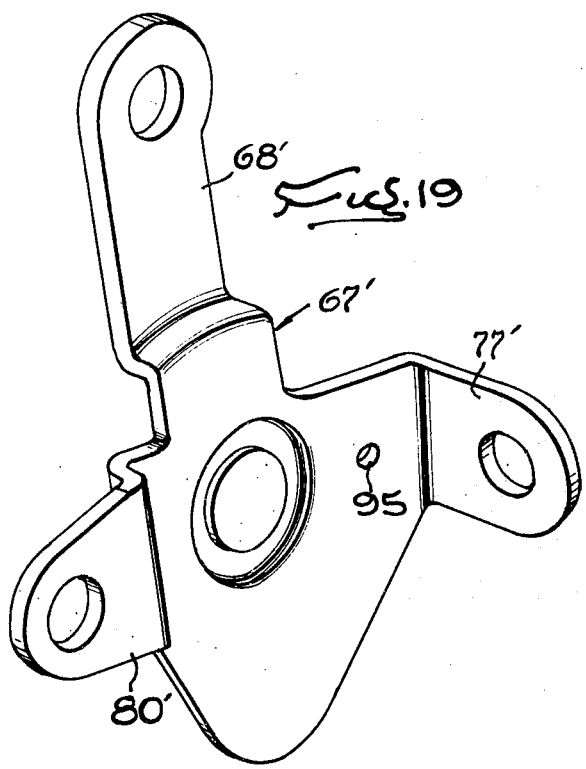

United States Patent Office 3,511,526
Patented May 12, 1970

3,511,526
VEHICLE DOOR LATCH
Leonard K. Ploughman, Rockford, Ill., assignor to Atwood Vacuum Machine Company, Rockford, Ill., a corporation of Illinois
Continuation-in-part of application Ser. No. 650,062, June 29, 1967. This application July 1, 1968, Ser. No. 748,124
Int. Cl. E05c 3/16
U.S. Cl. 292—216                             15 Claims

ABSTRACT OF THE DISCLOSURE

A free-wheeling, dual preset latch for a vehicle door and including a transmitter normally transferring the motion of an actuator to a pawl to release the latch when the actuator is operated either by an inside remote handle or by an outside pushbutton. By depressing a garnish button or by operating a key, the transmitter may be moved to a position uncoupling the pawl from the actuator thereby to lock the latch and to cause the actuator to free-wheel upon being operated. The transmitter remains coupled to and movable with the actuator at all times and carries a cancellation lever which normally restores the latch to an unlocked condition automatically when the door is closed with the garnish button depressed thereby to prevent unintentional locking of the door. The cancellation lever, however, may be disabled to permit keyless locking from the outside of the vehicle if, in addition to depressing the garnish button and prior to closing the door, the outside pushbutton is actuated to preset the latch. In one embodiment, the cancellation lever can be disabled only if the pushbutton is held in an actuated condition during closing of the door while, in a second embodiment, the cancellation lever can be disabled by actuating the pushbutton only momentarily and then by closing the door in a normal manner.

Cross-reference to a related application

This application is a continuation-in-part of my copending application Ser. No. 650,062, filed June 29, 1967, and now abandoned.

Background of the invention

This invention relates to a latch of the type commonly used on the doors of automotive vehicles and, more particularly, to a so-called free-wheeling latch. In such a latch, a transmitter normally couples a latching mechanism for releasing the latch with a manual actuator operable from the outside of the door, and normally transfers the motion of the actuator to the latching mechanism to trip the latch. To lock the latch, the transmitter is shifted to a position uncoupling the outside actuator and the latching mechanism and, as a result, the actuator simply free-wheels or makes an idle motion with respect to the latching mechanism when operated with the latch in a locked condition.

Conventionally, shifting of the transmitter to its uncoupling position, and thus locking of the latch, may be accomplished from the outside of the vehicle by a key or from the inside of the vehicle by either a remote handle or a garnish button. In addition, the latch may be preset for locking from the outside without a key by first shifting the transmitter to its uncoupling position and then by operating the outside actuator prior to closing the door. To prevent unintentional keyless locking of the door, the latch is self-cancelling, that is, the latch is set in an unlocked condition automatically by a cancellation member if the door is closed without first presetting the latch and disabling the action of the cancellation member by operating the outside actuator.

Summary of the invention

The primary aim of the present invention is to provide a free-wheeling, self-cancelling and presettable latch of the above character which is of simpler and less expensive construction and which may be made in a smaller and more compact package than prior latches of the same general type. In part, this is achieved by connecting the cancellation member directly to the transmitter and by leaving the transmitter coupled to the actuator even when the actuator is uncoupled from the latching mechanism so that, when the actuator is operated to preset the latch, its motion is transferred directly to the cancellation member to disable the latter. Since the cancellation member thus always moves with the actuator, there is no need of establishing a momentary disabling connection between the two and therefore the complexity of the latch is reduced.

The invention also resides in the novel manner of connecting the transmitter to the actuator and in the unique mounting of the cancellation member to keep the transmitter coupled to the actuator at all times and to permit disabling of the cancellation member.

In another aspect, the invention aims to provide a basically simple, inexpensive and compact latch of the above type in which the cancellation member may be disabled and the latch preset for keyless locking by performing two separate manual operations in proper sequence when the door is open and then by doing nothing more than simply swinging the door closed in a normal manner.

Brief description of the drawings

FIG. 1 is a fragmentary cross-section taken through a door equipped with one embodiment of a latch incorporating the novel features of the present invention.

FIG. 2 is an enlarged fragmentary cross-section taken along the line 2—2 of FIG. 1.

FIG. 3 is an enlarged fragmentary cross-section taken along the line 3—3 of FIG. 1 and showing the latch in a latched and unlocked condition.

FIG. 4 is a view similar to FIG. 3 and showing the latch in an unlocked condition and being released by the outside actuator.

FIG. 5 is a view similar to FIG. 3 and showing the latch in a locked condition.

FIGS. 6, 7 and 8 are fragmentary views similar to FIGS. 3, 4 and 5, respectively, with parts broken away for clarity of illustration.

FIG. 9 is a view similar to FIG. 6 and showing automatic unlocking of the latch.

FIG. 10 is a view similar to FIG. 6 and showing the cancellation member in a disabled condition to permit keyless locking of the door.

FIGS. 11 to 13 are fragmentary perspective views of various parts of the latch.

FIG. 14 is a view similar to FIG. 3 but showing a second embodiment of the latch in a latched and unlocked condition.

FIG. 15 is a view similar to FIG. 14 but showing the latch of FIG. 14 in an unlocked condition and being released by the outside actuator.

FIG. 16 is a view similar to FIG. 14 but showing the latch of FIG. 14 in a locked and unlatched condition.

FIG. 17 is a view similar to FIG. 14 but showing the latch in a preset condition to permit keyless locking of the door.

FIG. 18 is an enlarged fragmentary cross-section taken substantially along the line 18—18 of FIG. 17.

FIGS. 19 and 20 are enlarged perspective views of parts of the latch shown in FIG. 14.

Description of the preferred embodiments

As shown in the drawings for purposes of illustration, the invention is embodied in a latch particularly adapted for use with the door 20 of an automotive vehicle and including a pivoted latching element 21 carried by the door and coacting with a striker 23 mounted on a post 24 of the vehicle frame to hold the door in a tightly closed position. In this instance, the latching element is a forklike member formed with a recess 25 (FIG. 3) for receiving the striker. As the door is swung closed, contact of an edge 26 of the recess with the striker turns the latching element clockwise from an unlatched position shown in FIG. 4 to a latched position shown in FIG. 3 to prevent separation of the latching element from the striker and thus hold the door closed and latched.

Herein, the latching element 21 is journaled for rotation intermediate the ends of a shaft 27 which extends horizontally between a pair of vertical base plates 29 and 30 (FIGS. 1 and 2) spaced from and fastened to each other and housed within the door 20. The base plate 29 is attached to the end wall 31 of the door and is formed with a flange 33 extending between the two plates and along the inner wall of the door. Alined recesses (not shown) formed in the base plate 29 and the end wall 31 expose the recess 25 of the latching element for latching with the striker 23 when the door is swung to the closed position.

Formed on an arcuate edge of the latching element 21 opposite the forked recess 25 is a ratchet 34 (see FIG. 10) comprising a pair of angularly spaced teeth 35 and 36 adapted to cooperate with a blocking-type pawl 37 which, together with the ratchet, constitutes a latching mechanism. The pawl is fulcrumed on a pin 39 fixed to the base plate 29 above the shaft 27 and includes an arm 40 extending downwardly toward the ratchet and terminating in a free end engageable with the teeth. The pawl is urged into engagement with the ratchet by a coiled spiral spring 41 (FIG. 5) surrounding the pin 39 and anchored between the pin and a horizontally projecting flange 43 which is formed integrally with the pawl. When the pawl engages the tooth 35, the latching element is held in the fully latched position (FIG. 3) and, when the pawl engages the tooth 36, the latching element is held in the safety or secondary position (not shown). Counterclockwise turning of the pawl (FIG. 3) about the pin 39 releases the ratchet and enables the latching element to turn to the unlatched position shown in FIG. 4 to release the striker 23 and permit opening of the door. A contractile spring 44 (FIG. 13) is stretched between a tab (not shown) projecting horizontally from the base plate 29 and a finger 45 on one side of the latching element 21 and continuously urges the latching element toward the unlatched position.

To release the latch from the outside of the vehicle, a push button 46 (FIG. 1) is slidably mounted in an outside handle 47 on the outer wall 49 of the vehicle door and is operable, when depressed, to swing the pawl 37 out of engagement with the ratchet 34 thereby to enable the spring 44 to turn the latching element 21 to the unlatched position. When the pushbutton is depressed, a rod 50 slidably mounted in the door is pushed inwardly against an offset flange 51 formed at the lower end of a vertical arm 53 (see FIG. 12) of a generally T-shaped pawl actuator member or contactor 54 which includes an upper cross arm 55 fulcrumed on a stud 56 fixed to the base plate 30. The contactor is rotated counterclockwise about the stud to an operated position by the pushbutton and is returned in the opposite direction by a contractile spring 57 (FIG. 4) stretched between the lower end of the arm 53 and a finger 59 projecting horizontally from the base plate 30. To release the latch from the inside of the vehicle, a remote handle (not shown) positioned on the inside of the door is connected to a rod 60 (FIGS. 1 and 2) which is attached to a bell crank 61 fulcrumed on a pin 63 fixed to the flange 33. When the inside handle is actuated, the bell crank is pivoted clockwise about the pin 63 to cause an arm 64 of the crank to move under and lift the cross arm 55 of the contactor and thereby rotate the contactor counterclockwise to its operated position.

Coupling of the contactor 54 to the pawl 37 to trip the latch is effected in the present instance by a force transmitter member 65 which normally (FIGS. 3, 4 and 7) transfers the motion of the contactor to the pawl to swing the pawl away from the ratchet 34. To lock the latch and prevent unauthorized opening of the door 20, the transmitter is shifted to a position (FIGS. 5 and 8) uncoupling the contactor from the pawl so that the contactor, when actuated, simply makes an idle motion or freewheels with respect to the pawl and thus is ineffective to move the pawl out of engagement with the ratchet. Inadvertent locking of the door is prevented by a cancellation member 66 (FIG. 6) which returns the transmitter to the coupling or unlocked position automatically if the door is closed with the transmitter accidentally set in the uncoupling or locked position. The cancellation member may be disabled, however, by intentional presetting of the latch before closing of the door thereby to prevent such automatic return of the transmitter and to permit the latch to remain in a locked condition upon closing of the door.

In accordance with the present invention, the transmitter 65 remains permanently coupled to and movable with the contactor 54 throughout its free-wheeling motion, and the cancellation member 66 in turn, is carried permanently on the transmitter itself so that such free-wheeling motion is transferred directly to the cancellation member and can be utilized to disable the latter and preset the latch without the need of establishing a separate and temporary motion-transferring connection to the cancellation member. By connecting the cancellation member directly to the transmitter while leaving the transmitter coupled to the contactor at all times, the latch is of less expensive and more compact construction than prior latches of the same general type.

In the present instance, the transmitter 65 is mounted for bodily shifting from the coupling position (FIGS. 4 and 7) to the uncoupling position (FIGS. 5 and 8) in response to turning of a locking lever 67 from an unlocked position to a locked position. The locking lever is journaled to turn on the right hand side (FIG. 2) of the base plate 30 and about the right hand end of the shaft 27 and includes a vertical arm 68 (FIG. 11) which projects into the space between the base plate 29 and 30 through an arcuatae slot 70 (FIG. 4) formed in the base plate 30. The transmitter is mounted pivotally on but for bodily shifting with the upper end of the arm 68 by a stud 71 carried by the arm. To couple the transmitter to the pawl 37, a projection in the form of a pin 73 attached to the transmitter and spaced radially from the stud 71 projects into an elongated slot 74 formed in the cross arm 55 of the contactor 54, the pin and the slot constituting a lost-motion connection between the contactor and the transmitter.

When locking lever 67 is turned to its unlocked position (FIG. 3) to shift the transmitter 65 to its coupled position, an ear 75 formed on the upper end of the transmitter lies alongside the flange 43 on the pawl. Thus, as the contactor 54 is actuated and swung counterclockwise, a surface formed by the lower edge of the slot 74 bears against the pin 73 to turn the transmitter counterclockwise about the stud 71. Such turning of the transmitter results in the ear 75 moving into engagement with the flange 43 to swing the pawl counterclockwise about the pin 39 (see FIG. 4) and out of engagement with the ratchet 34 so as to release the latching element 21 from the striker 23. In response to movement of the locking lever 67 to the locked position (FIG. 5), the pin 73 sildes relative to the contactor and from one extreme end of the slot 74 to the other, and the ear 75 thus is shifted away from the flange 43. Accordingly, actuation of the contactor in an attempt to release the latching element, while still being effective to turn the transmitter through a limited range by means of the pin 73 and the slot 74, simply results in idle turning of the ear 75 past the flange 43 thereby leaving the pawl in holding engagement with the latching element. The contactor therefore free-wheels with respect to the pawl thus making it impossible to unlatch the door as long as the locking lever remains in its locked position and holds the transmitter uncoupled from the pawl.

To turn the locking lever 67 between its locked and unlocked positions, a garnish button (not shown) accessible from the inside of the door is attached to the lever by a manual member or vertical rod 76 (FIG. 3) which is fastened at its lower end to an arm 77 of the lever, the arm 77 extending radially of the shaft 27 and transversely of the vertical arm 68. Up and down movement of the garnish button turns the locking lever back and forth between the unlocked and locked positions. In addition, the latch may be unlocked from outside the vehicle by a key which, when inserted into and rotated within a key well (not shown), actuates a link 79 (FIG. 3) attached to an ear 80 on the locking lever to turn the latter to the unlocked position. A toggle spring 81 (FIG. 11) anchored between the arm 77 and the base plate 30 snaps back and forth over center as the lever is turned between its positions and serves to hold the lever yieldably in each of the positions.

The cancellation member 66 (FIG. 6) for preventing unintentional locking of the door herein is a lever which is pivotally connected at one end directly to the transmitter 65 by means of the pin 73 carried on the transmitter. Intermediate its ends, the cancellation lever 66 is formed with an elongated slot 83 which receives a guide pin 84 projecting horizontally from the base plate 30. When the locking lever 67 is turned from its unlocked position (FIGS. 4 and 7) to its locked position (FIGS. 5 and 8) with the door unlatched, the cancellation lever shifts with the transmitter 65 while, at the same time, turning clockwise about the axis of the pin 73 by virtue of the guide pin 84 establishing a fulcrum on the edges of the slot 83. Final movement of the locking lever to the locked position turns the cancellation lever to an active position shown in FIG. 8 in which the free end 85 of the cancellation lever is disposed in the path through which the finger 45 on the latching element 21 moves as the latter engages the striker 23 and turns to the latched position.

Thus, if the locking lever 67 is turned to the locked position by accidental depression of the garnish button when the door is open, the finger 45 will engage the free end 85 of the cancellation lever as the door is closed and as the latching element 21 is turned to the latched position, the finger thus constituting a kick-out member on the latching element. As a result of such engagement, the cancellation lever is turned counterclockwise about the axis of the guide pin 84 and exerts a force on the transmitter 65 through the pin 73 to shift the transmitter from right to left (FIG. 9). The force exerted on the transmitter is transferred, in turn, to the locking lever 67 through the stud 71 and is effective to turn the locking lever counterclockwise about the shaft 27 and back toward the unlocked position. The torsion spring 81, upon crossing over center, snaps the locking lever positively to the unlocked position and causes the cancellation lever to pivot about the pin 73 while sliding along the pin 84 so that the free end of the lever is shifted out of the path of the kick-out finger 45 as shown in FIG. 7 and will not be engaged during normal turning of the latching element 21 between the latched and unlatched positions as the door is closed and opened in normal fashion. With the foregoing arrangement, the cancellation lever 66 automatically restores the latch to an unlocked condition as an incident to closing of the door and thus prevents unintentional locking if the garnish button should be depressed accidentally.

Presetting of the latch to disable the cancellation lever 66 and permit keyless locking of the door from the outside of the vehicle may be achieved by performing two separate and intentional manual operations in proper sequence. First, the garnish button must be depressed while the door is open thereby to turn the locking lever 67 to its locked position and to uncouple the contactor 54 from the pawl 37. Thereafter, the contactor must be held in its operated position by depression of the pushbutton 46 while the door is being closed in order to disable the cancellation lever and to prevent the locking lever from immediately being restored to its unlocked position. As will be seen by viewing FIGS. 8 and 10, actuation of the contactor with the locking lever disposed in its locked position results in bearing engagement of the bottom edge of the slot 74 with the pin 73 to turn the transmitter 65 counterclockwise about the stud 71 through a limited range of movement even though the transmitter is in its uncoupling position. At the same time, the transmitter slides the cancellation lever 66 along the guide pin 84 and lifts the cancellation lever to the disabled position shown in FIG. 10 in which the free end 85 of the lever is shifted upwardly from the path of the kick-out finger 45 on the latching element 21. Thus, the finger 45 will not engage the cancellation lever as the door is closed and as the latching element is turned to its latched position. As a result, the cancellation lever is ineffective to restore the locking lever to its unlocked position, and the latch therefore will remain locked as the door is closed.

From the foregoing, it will be apparent that the transmitter 65 remains coupled to the contactor 54 at all times and thus is moved through a limited range when the contactor is actuated to preset the latch. Since the cancellation lever 66 is carried on the transmitter, such movement is transferred directly to the cancellation lever and the latter is disabled automatically. As a result, it is not necessary to establish a connection between the transmitter and the cancellation lever to disable the lever and then break the connection during normal functioning of the latch. The pin and slot connection 73, 74 between the contactor and the transmitter advantageously enables shifting of the transmitter relative to the contactor between the coupling and uncoupling positions while transferring movement of the contactor to the transistor in each of the positions. Similarly, the pin and slot mounting 83 and 84 of the cancellation lever enables movement of the lever with the transmitter and also serves as a fulcrum to direct the force exerted by the kick-out finger 45 to the transmitter.

Another embodiment of a latch incorporating additional novel features is shown in FIGS. 14 to 20 in which parts corresponding to the parts of the latch shown in FIGS. 1 to 13 are indicated by the same but primed reference numerals. In this instance, the cancellation lever 66' (FIG. 17) may be disabled simply by depressing the outside pushbutton 46' (FIG. 15) momentarily while the door is open and after the locking lever 67' first has been moved to its locked position by the manually operable garnish button actuator member 76'. With the cancellation lever 66' disabled in this manner, the door may be latched and locked simply by swinging the door closed in a normal manner and without need of holding the pushbutton in a depressed condition during such swinging.

To achieve the foregoing, retaining means in the form of an over-center spring 90 (FIGS. 14 to 18) is provided for holding the contactor 54' in the operated position (FIG. 17) to which the contactor is swung when the pushbutton 46' is depressed with the locking lever 67' disposed in its locked position and with the transmitter 65' disposed in its uncoupling position. Because of the spring 90 holding the contactor in its operated position, the cancellation lever 66' is held in its disabled inactive position (FIG. 17) and, as a result, the cancellation lever remains in its inactive position even when the pushbutton is released. The door thus may be closed without holding in on the pushbutton during such closing and yet the latch will remain in a locked condition.

More specifically and as shown in FIGS. 14 and 18, the spring 90 is a coiled toggle spring disposed between the vertical arm 53' of the contactor 54' and the lower end portion of the locking lever 67'. The spring is anchored by projecting one of the spring ends 91 through a hole 93 in the arm 53' and by projecting the other spring end 94 through a hole 95 in the locking lever 67'. When the locking lever is in its unlocked position (FIG. 14), the end 91 of the spring 90 lies to the left of an imaginary center line a which extends between the spring end 94 and the center of the stud 56' mounting the contactor 54'. Accordingly, the spring 90 urges the contactor 54' clockwise about the stud and keeps the contactor flange 51' pressed against the end of the rod 50' connected to the outside pushbutton 46'. When the pushbutton is depressed with the locking lever 67' disposed in its unlocked position (see FIG. 15), the contactor 54', as before, is rotated counterclockwise about the stud 56' to its operated position to release the pawl 37' from the ratchet 34' but the spring end 91 remains to the left of the imaginary line a as shown in FIG. 15. Accordingly, when the pushbutton 46' is released, the spring 90 returns the contactor 54' clockwise about the stud 56' to its normal, unoperated position (FIG. 14). The toggle spring 90 thus advantageously performs the function of the contractile spring 57 of the first embodiment of the latch and, as a result, the contractile spring may be eliminated.

To lock the door from the outside without a key, the locking lever 67' first is turned from its unlocked position (FIG. 15) to its locked position (FIG. 16) by depressing the garnish button actuator 76'. As the locking lever is turned to its locked position, the right end 94 of the spring 90 swings to the left and assumes the position shown in FIG. 16. In this position of the spring, an imaginary line b extending through the spring end 94 and the center of the stud 56' lies to the left of the line a which extended through the corresponding elements in the unlocked position of the locking lever 67'.

With the locking lever 67' simply moved to its unlocked position as described, the free end 85' of the cancellation lever 66' projects into the path of the kick-out finger 45' on the latching element 21' in the same manner as in the first embodiment of the latch (see FIG. 16). Thus, if the door is closed, the kick-out finger 45', as before, will engage the cancellation lever 66' and will cause the locking lever 67' to return to its unlocked position (FIG. 14). By momentarily depressing the pushbutton 46', however, before closing the door, the cancellation lever 66' may be disabled and moved to its inactive position to permit keyless locking of the door. When the pushbutton is depressed, the contactor 54' is turned counterclockwise about the stud 56' to its operated position (FIG. 17) and, as a result of such turning, the transmitter 65' is turned counterclockwise about the stud 71' to pull the cancellation lever 66' upwardly to its inactive position out of the path of the kick-out finger 45' as shown in FIG. 17. As the contactor 54' is turned to its operated position, the spring 90 crosses center, that is, the spring end 91 moves from left to right and crosses to the right of the center line b (see FIG. 17). Upon passing across center, the spring 90 snaps the contactor 54' to its operated position and holds the contactor in such position thereby to hold the cancellation lever 66' in its inactive position even though the pushbutton 46' is subsequently released to allow the rod 50' to move away from the flange 51' on the contactor. Since the cancellation lever 66' thus is disabled and held in its inactive position, the latch will remain locked as the door is closed and yet it is not necessary to hold the pushbutton in a depressed condition while closing the door. Thus, the basic simplicity of the latch is maintained while reducing the complexity of the operations necessary to achieve keyless locking.

It will be apparent that the locking lever 67' first must be moved manually to it locked position when the door is open before momentarily depression of the pushbutton 46' will be effective to preset the latch for keyless locking. Should the pushbutton be depressed when the locking lever is in its unlocked position (FIG. 15), the spring 90 will simply return the contactor 54' to its normal position upon release of the pushbutton and will not cross over center to hold the contactor and the cancellation lever 66' in their operated and inactive positions. As a result, unintentional locking of the door will not be produced by an inadvertent depression of the pushbutton 46', but instead, locking may be accomplished only when depression of the pushbutton is preceded by a shifting of the locking lever 67' to its locked position.

To limit counterclockwise swinging of the contactor 54' when the spring 90 crosses over center and snaps the contactor to its operated position, the lower edge 97 (FIGS. 17 and 20) of the arm 53' of the contactor engages the flange 77' of the locking lever 67' as shown in FIG. 17. Also, when the locking lever 67' is returned to its unlocked position upon unlocking of the door either by the key or the garnish button, the spring 90 crosses over the line b in a reverse direction and snaps the contactor back to its normal, unoperated position (FIG. 14).

I claim as my invention:

1. In a latch having a base, a latching element fulcrumed on said base to turn between latched and unlatched positions, latching mechanism selectively operable to hold said latching element in said latched position and to release the element for turning to said unlatched position, an actuator member mounted on said base for movement to an operated position, a transmitter member shiftable on said base between positions coupling and uncoupling said actuator with said latching mechanism and being operable, when in said coupling position, to transfer motion of said actuator to said latching mechanism thereby to release the latter from said latching element, said actuator making an idle movement with respect to said latching mechanism when the actuator is moved to said operated position with said transmitter disposed in said uncoupling position, and a locking lever mounted on said base for movement between locked and unlocked positions and operably connected to said transmitter to shift the latter between said uncoupling and said coupling positions as an incident to such movement, the improvement in said latch comprising, a connection between said actuator and said transmitter, said connection leaving said transmitter free to shift relative to said actuator between said coupling and uncoupling positions while transferring movement of said actuator to said transmitter when the latter is in either of said coupling and uncoupling positions whereby said transmitter is moved each time said actuator is moved to said operated position, a cancelling element supported for movement to an active position when said locking lever is moved to said locked position and operable in said active position to move the locking lever to said unlocked position as said latching element is turned from said unlatched position to said latched position, and means connecting said cancelling element to said transmitter for movement with the transmitter and out of said active position as a result of said actuator being moved to said operated position with said transmitter disposed in said uncoupling position and with said locking lever disposed in said locked position whereby said latching element may be turned to said latched position with said locking lever remaining in said locked position.

2. A latch as defined in claim 1 in which said transmitter member is connected pivotally to said locking lever to turn about a first axis, said connection including an abutment surface formed on one of said members and a projection formed on the other of said members and engageable with said surface, said projection sliding relative to said surface as said transmitter member is shifted between said coupling and uncoupling positions, and said projection and said surface bearing against each other to turn said transmitter member about said axis when said actuator member is moved to said operated position and when said transmitter member is disposed in either of said coupling or uncoupling positions.

3. A latch as defined in claim 2 in which said abutment surface is one edge of an elongated slot formed in one of said members and receiving said projection to guide said transmitter member as the latter is shifted between said coupling and uncoupling positions.

4. A latch as defined in claim 2 further including a kick-out member carried on said latching element and movable in a predetermined path as said latching element is turned from said unlatched position to said latched position, said cancelling element being a lever having one end pivotally connected to said transmitter about a second axis spaced from said first axis and having a free end turnable into and out of the path of movement of said kick-out member as said transmitter is shifted between said uncoupling and coupling positions by said locking lever.

5. A latch as defined in claim 4 in which said kick-out member engages the free end of said cancelling lever when the latter is disposed in said path and as said latching element is turned from said unlatched position to said latched position, said kick-out member transmitting force to said transmitter through said cancelling lever and said second axis thereby to shift said transmitter to said coupling position.

6. A latch as defined in claim 5 further including a pin mounted on said base and pivotally mounting said cancelling lever intermediate said ends for turning of said free end into and out of the path of said kick-out as said transmitter is shifted between said uncoupling and coupling positions by said locking lever, and said cancelling lever being formed with a slot receiving said pin and accommodating movement of said cancelling lever about said first axis, along said pin, and out of said path when said transmitter is in said uncoupling position and is moved by said actuator.

7. In a latch having a base, a latching element mounted on said base to turn between latched and unlatched positions, latching mechanism selectively operable to hold said latching element in said latched position and to release the element for turning to said unlatched position, an actuator mounted on said base for movement to an operated position, a transmitter shiftable on said base between positions coupling and uncoupling said actuator with said latching mechanism and being operable, when in said coupling position, to transfer motion of said actuator to said latching mechanism thereby to release the latter from said latching element, said actuator making an idle movement with respect to said latching mechanism when the actuator is moved to said operated position with said transmitter disposed in said uncoupling position, the improvement in said latch comprising, a lost-motion connection between said actuator and said transmitter, said connection leaving said transmitter free to shift relative to said actuator between said coupling and uncoupling positions while transferring movement of said actuator to sad transmitter when the latter is in either of said coupling and uncoupling positions whereby said transmitter is moved through a predetermined range within said coupling and uncoupling positions each time said actuator is moved to said operated position, a cancelling member carried by said transmitter for movement to an active position when said transmitter is shifted to said uncoupling position and operable in said active position to move said transmitter to said coupling position as said latching element is turned from said unlatched position to said latched position, and means connecting said cancelling member to said transmitter for movement with the transmitter and out of said active position when the transmitter is disposed in said uncoupling position and is moved through said range by said actuator whereby said latching element may be turned to said latched position with said transmitter remaining in said uncoupling position.

8. A latch as defined in claim 7 in which said cancelling member is a lever pivotally connected to said transmitter to turn about an axis, and further including a pin on said base projecting into an elongated slot in said cancellation lever to establish a fulcrum for said lever when said transmitter is shifted between said coupling and uncoupling positions while enabling sliding of said lever on said fulcrum when said transmitter is moved through said range.

9. A latch as defined in claim 7 further including means operable in response to movement of said cancelling element out of said active position for holding the cancelling element out of the active position.

10. In a latch having a base, a latching element mounted on said base to turn between latched and unlatched positions, latching mechanism selectively operable to hold said latching element in said latched position and to release the element for turning to said unlatched position, an actuator mounted on said base for movement to an operated position, a transmitter shiftable on said base between positions coupling and uncoupling said actuator with said latching mechanism and being operable, when in said coupling position, to transfer motion of said actuator to said latching mechanism thereby to release the latter from said latching element, said actuator making an idle movement with respect to said latching mechanism when the actuator is moved to said operated position with said transmitter disposed in said uncoupling position, the improvement in said latch comprising, a lost-motion connection between said actuator and said transmitter, said connection leaving said transmitter free to shift relative to said actuator between said coupling and uncoupling positions while transferring movement of said actuator to said transmitter when the latter is in either of said coupling and uncoupling positions whereby said transmitter is moved through a predetermined range within said coupling and uncoupling positions each time said actuator is moved to said operated position, a cancelling lever carried by and pivotally connected to said transmitter, a pin-and-slot connection between said cancelling lever and said base permitting both pivoting and sliding of said cancelling lever, said pin-and-slot connection causing pivoting of said cancelling lever to an active position when said transmitter is shifted to said uncoupling position, said cancelling lever being operable in said active position to move said transmitter to said coupling position as said latching element is turned from said unlatched position to said latched position, and said pin-and-slot connection guiding said cancelling lever for sliding movement out of said active position when the transmitter is disposed in said uncoupling position and is moved through said range by said actuator whereby said latching element may be turned to said latched position with said transmitter remaining in said uncoupling position.

11. In a latch for a vehicle door, the combination of, a base, a latching element fulcrumed on said base to turn between latched and unlatched positions, a first manual member disposed on the inside of the door, a locking lever connected to said member and mounted on said base to turn between locked and unlocked positions in response to manual operation of said member, said locking lever being operable when in said locked position and when said latching element is in said latched position to prevent release of the latching element from the latched position and being operable when in said unlocked position to permit release of the latching element, a cancelling element mounted on said base for movement to an active position and operable in such position to turn said locking lever from said locked position to said unlocked position as said latching element is moved from said unlatched position to said latched position, an actuator manually operable from a side of the door and movable between a normal position and an operated position, said actuator being operable to release said latching element for movement to said unlatched position when moved to said operated position with the locking lever in said unlocked position, said actuator being connected to said cancelling element and being operable, upon movement from said normal position to said operated position when said latching element is in said unlatched position and after said locking lever has been set in said locked position, to move said cancelling element to an inactive position to disable the latter, and means responsive to movement of said actuator to said operated position when said latching element is in said unlatched position and said locking lever is in said locked position to hold said actuator in said operated position and thereby hold said cancelling element in said inactive position whereby said latching element may be moved to said latched position with said locking lever remaining in said locked position and with said actuator remaining in said operated position.

12. A latch as defined in claim 11 in which said means comprises an over-center spring connected between said locking lever and said actuator, said spring being located to urge said actuator toward said normal position when said locking lever is disposed in said unlocked position, and said spring crossing over center and urging said actuator toward said operated position when the actuator is moved toward said operated position with said locking lever disposed in said locked position.

13. In a latch having a base, a latching element fulcrumed on said base to turn between latched and unlatched positions, latching mechanism selectively operable to hold said latching element in said latched position and to release the element for turning to said unlatched position, a manually operable actuator mounted on said base for movement between normal and operated positions, a transmitter shiftable on said base between positions coupling and uncoupling said actuator with said latching mechanism and being operable, when in said coupling position to transfer to said latching mechanism the motion undertaken by said actuator in moving to said operated position thereby to release the latching mechanism from said latching element, said actuator making an idle movement with respect to said latching mechanism when the actuator is moved to said operated position with said transmitter disposed in said uncoupling position, and a locking lever mounted on said base for movement between locked and unlocked positions and operably connected to said transmitter to shift the latter between said uncoupling and said coupling positions as an incident to such movement, the improvement in said latch comprising a connection between said actuator and said transmitter, said connection leaving said transmitter free to shift relative to said actuator between said coupling and uncoupling positions while transferring movement of said actuator to said transmitter when the latter is in either of said coupling and uncoupling positions whereby said transmitter is moved each time said actuator is moved to said operated position, a cancelling element supported for movement to an active position when said locking lever is moved to said locked position and operable in said active position to move the locking lever to said unlocked position as said latching element is turned from said unlatched position to said latched position, means connecting said cancelling element to said transmitter for movement with the transmitter and out of said active position when said actuator is moved to said operated position with said transmitter disposed in said uncoupling position and with said locking lever disposed in said locked position whereby said latching element may be turned to said latched position with said locking lever remaining in said locked position, and retaining means responsive to movement of said actuator to said operated position when said transmitter is in said uncoupling position for holding said actuator in said operated position thereby to hold said cancelling element in said inactive position.

14. A latch as defined in claim 13 in which said retaining means comprise an over center spring connected between said actuator and said locking lever and permitting return of said actuator to said normal position when said actuator is moved to said operated position with said locking lever disposed in said unlocked position, said spring crossing over center when said actuator is moved to said operated position with said locking lever disposed in said locked position and acting to hold said actuator in said operated position.

15. A latch as defined in claim 14 in which said spring urges said actuator toward said normal position when the actuator is moved to said operated position with said locking lever disposed in said unlocking position.

References Cited

UNITED STATES PATENTS

| | | | |
|---|---|---|---|
| 2,625,420 | 1/1953 | Endter | 292—198 |
| 3,027,184 | 3/1962 | De Vito | 292—216 |
| 3,129,026 | 4/1964 | Gergoe et al. | 292—280 |
| 3,190,682 | 6/1965 | Fox et al. | 292—216 |

RICHARD E. MOORE, Primary Examiner